United States Patent Office 3,697,352
Patented Oct. 10, 1972

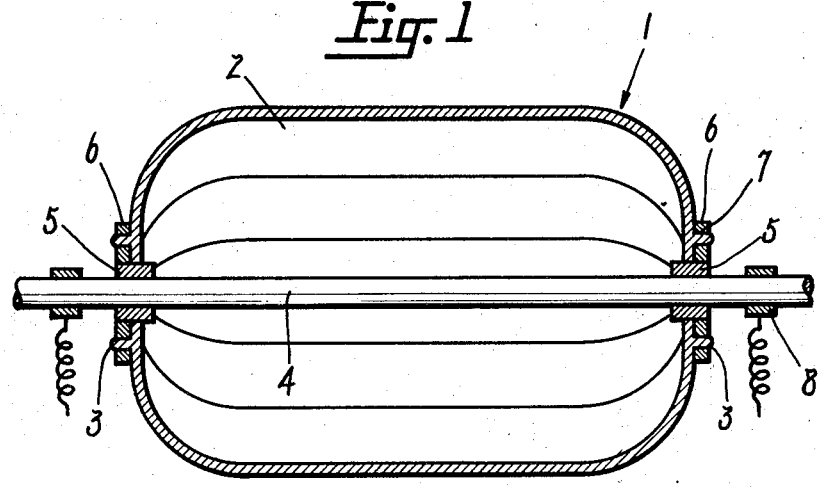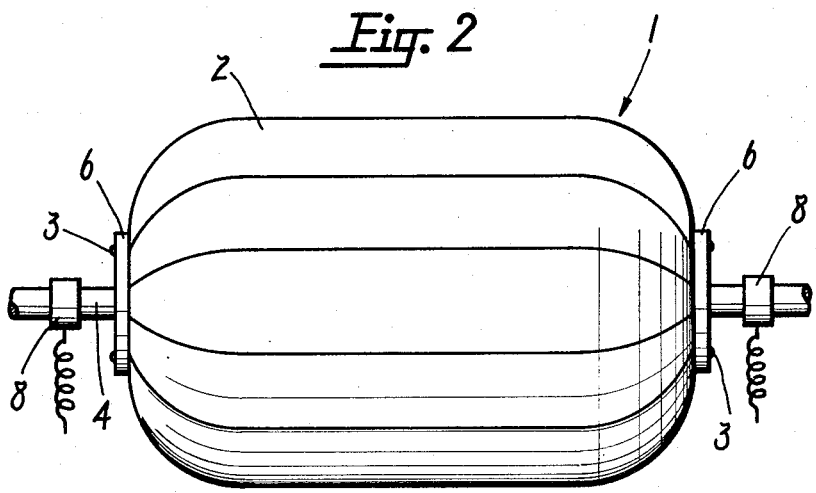

3,697,352
BONDING AND ASSEMBLING PROCESS BY A MAGNETIC FORCE
Hideo Itokawa, Tokyo, Japan, assignor to Taiyo Kogyo Company Limited, Tokyo, Japan
Filed Jan. 15, 1969, Ser. No. 791,260
Claims priority, application Japan, Jan. 19, 1968, 43/3,048
Int. Cl. H01f 13/00
U.S. Cl. 156—272     7 Claims

ABSTRACT OF THE DISCLOSURE

This invention is a method wherein a ferromagnetic substance is used for the bonded parts of small divided pieces to be bonded together, said pieces are bonded together by flowing an instantaneous electric current to it and the respective pieces are separated from each other by flowing the electric current in a direction reverse to that of the above mentioned current.

---

This invention relates to a bonding and assembling process by a magnetic force.

When a ferromagnetic substance is used for parts to be bonded together and an instantaneous electric current is made to flow to it, the ferromagnetic body will be magnetized, and attracting force will be produced by the residual magnetism and the parts will be bonded together. Due to the residual magnetism of the ferromagnetic body, the bonded parts will remain as bonded. Further, in the case of separating these bonded parts from each other, if the flowing direction of the electric current is reversed and the electric current of a strength required for the demagnetization is made to flow, the residual magnetism of the ferromagnetic body will be eliminated and a repellent force will be produced so that the parts may be separated from each other. The present invention is to provide a bonding and assembling process utilizing such magnetic force.

The process of the present invention can be applied to assembling and disassembling split molds for molding any plastic material, assembling and disassembling any buildings and structures, bonding and separating component parts of rolling stock, ships, aircraft, automobiles, rockets and other vehicles and carriers, assembling and disassembling the above mentioned parts, bonding such things having many bonding points as radiators and bonding any other general machines and household articles which have been conventionally bonded by bolts, nuts, screws, rivets, welding and any binder.

An object of the present invention is to provide a method wherein parts can be assembled and disassembled very simply.

In the accompanying drawings:

FIG. 1 is a vertical sectional view showing an embodiment of the process of the present invention;

FIG. 2 is an elevational of view of FIG. 1.

The present invention shall be described in detail with reference to the accompanying drawings. The embodiment illustrated in the drawings represents the case of assembling and disassembling a split mold for molding barrel-shaped vessels of any plastic material. The split mold 1 is formed of many juxtaposed divided pieces 2 divided in the longitudinal direction so that, in case they are assembled, any desired form may be given. Each divided piece 2 is made of an iron plate, is provided with a ferromagnetic substance such as, for example, alnico 5 in each adjacent contact part or at least the areas of contact between adjacent pieces or items, is provided with a projection 3 at each end and is inserted at the above mentioned projection 3 into a through hole 7 provided in a flange 6 secured through an insulating ring 5 fixed to each end of a shaft 4 made of copper so as to be held. The shaft 4 is provided with an electrode 8 at each end.

Then, when an electric current (for example D.C. of 1000 amps for 0.1 to 0.2 second) is passed through the shaft 4 made of copper, the ferromagnetic body will be magnetized and the respective divided parts will produce an attraction in the contact parts, will be or otherwise held together and will remain bonded in the contact parts due to the residual magnetism. In such case, the bonding force is about 65 kg. on one bonding surface and is not seen to vary until 200° C. The thus formed split mold 1 is wound on the outer periphery with a proper string and is painted on the outside with a molten synthetic resin or other permanent binding means. After the synthetic resin thus applied to paint the outside of the split mold hardens to take the form of a vessel, the split mold is disassembled into the respective divided pieces and is taken out through the upper and lower openings of the vessel. In such case, in separating the respective divided pieces of the split mold, if an electric current is passed through the shaft in a direction reverse and equal to that in the case of bonding them, the residual magnetism of the ferromagnetic body will be eliminated, the bonding force of each bounded part will vanish, a repellent force will be produced and the divided pieces will be able to be easily separated from each other.

What is claimed is:

1. A bonding and assembling process by a magnetic force comprising the steps of flowing an electric current on the order of 1000 amps for a period of time on the order of 0.1 to 0.2 second through a shaft passed through the center of a mold formed of many divided pieces made of a ferromagnetic substance in the parts to be held together and insulated from the above-mentioned divided pieces so that the above-mentioned ferromagnetic substance may be magnetized and the divided pieces may be held together by the residual magnetism and then flowing the electrical current in a direction reverse to the above so that the divided pieces may be demagnetized.

2. A process for assembling items by use of a magnetic force, comprising the steps of:
   juxtaposing a plurality of said items which are provided with a magnetizable substance in at least the areas of contact between adjacent items;
   locating at least one electrical conductor in the vicinity of said juxtaposed items;
   passing a first electric current on the order of 1000 amps through said electrical conductor for a period of time on the order of 0.1 to 0.2 second to cause said magnetizable substance to be magnetized so that said juxtaposed items are drawn together and held by said magnetic force; and
   applying a permanent binding means contiguous to the outside perimeter of said juxtaposed items while said items are being held together by said magnetic force.

3. A process according to claim 2, wherein said permanent binding means is applied to the outside perimeter of said juxtaposed items after said period of time has elapsed and while said items are being held together by residual magnetism of said magnetizable substance.

4. A process according to claim 3, including the step of passing a second electrical current on the order of 1000 amps through said electrical conductor for a period of time on the order of 0.1 to 0.2 second to cancel said residual magnetism of said magnetizable substance so that said plurality of juxtaposed items may be readily separated, said second electrical current being opposite in polarity to that of said first electrical current.

5. A process according to claim 2, including the steps of demagnetizing said magnetizable substance, and
removing said plurality of items after said binding means has taken a permanent shape.

6. A process for assembling items by use of a magnetic force, comprising the steps of:
juxtaposing a plurality of said items which are provided with a magnetizable substance in at least the areas of contact between said adjacent items;
locating at least one electrical conductor in the vicinity of said juxtaposed items;
arranging said plurality of items symmetrically around said electrical conductor;
passing a first electrical current on the order of 1000 amps for a period of time on the order of 0.1 to 0.2 second through said electrical conductor to cause said magnetizable substance to become magnetized so that said juxtaposed items are drawn together and held by said magnetic force;
applying a permanent binding means contiguous to said juxtaposed items while said items are being held together by said magnetic force;
providing suitable openings in said binding means through which said items may be removed after said magnetizable substance has been demagnetized;
passing a second electrical current on the order of 1000 amps for a period of time on the order of 0.1 to 0.2 second through said electrical conductor to cancel said magnetism so that said plurality of juxtaposed items may be readily separated from one another;
said second electrical current being opposite in polarity to that of said first electrical current; and
removing said plurality of items after said binding openings in said binding means after said binding means has taken a permanent firm shape.

7. A process for assembling items by use of a magnetic force comprising the steps of:
juxtaposing a plurality of said items which are provided with a magnetizable substance in at least the areas of contact between adjacent items;
locating at least one electrical conductor in the vicinity of said juxtaposed items;
passing a first electrical current on the order of 1000 amps for a period of time on the order of 0.1 to 0.2 second through said electrical conductor to cause said magnetizable substance to be magnetized so that said juxtaposed items are drawn together and held by said magnetic force;
applying a permanent binding means contiguous to the outside perimeter of said juxtaposed items while said items are being held together by said magnetic force;
providing suitable openings in said permanent binding means through which said items may be removed after said magnetizable substance has been demagnetized;
passing a second electrical current on the order of 1000 amps for a period of time on the order of 0.1 to 0.2 second through said electrical conductor to cancel said magnetism so that said plurality of juxtaposed items may be readily separated from one another;
said second electrical current being opposite in polarity to that of said first electrical current; and
removing said plurality of items through said opening after said binding means has taken a permanent firm shape.

References Cited

UNITED STATES PATENTS

| 2,465,276 | 3/1949 | Ryder | 18—Magnet Digest |
| 3,448,253 | 6/1969 | Bramblett II et al. | 156—173 X |

CARL D. QUARFORTH, Primary Examiner

E. E. LEHMANN, Assistant Examiner

U.S. Cl. X.R.

18—DIG. 33; 156—173; 264—22